UNITED STATES PATENT OFFICE.

WILLIAM B. JOHNSON, OF ATLANTA, GEORGIA.

FOOD COMPOSITION FOR MAKING CAKES, &c.

1,335,242.   Specification of Letters Patent.   Patented Mar. 30, 1920.

No Drawing.   Application filed July 17, 1919. Serial No. 311,625.

*To all whom it may concern:*

Be it known that I, WILLIAM B. JOHNSON, a citizen of the United States of America, and a resident of Atlanta, county of Fulton, and State of Georgia, have invented certain new and useful Improvements in Food Compositions for Making Cakes, &c., of which the following is a full and clear specification.

The object of my invention is to produce a mixture of flour and other ingredients which will need nothing but the application of water to convert it into a cake-dough, and the special object of the invention is to so prepare the mixture that the ingredients will be thoroughly mixed and in the exact proportions to produce a cake of a given texture and quality and which will keep in prime condition for a long time, to thereby enable it to be put up in moisture-proof cartons for the market, as more fully hereinafter set forth.

The main ingredient of my ready-mix is wheat flour, preferably soft winter wheat. To a suitable quantity of flour, I add a quantity of whole egg and rich milk, the egg and milk being, before being added to the flour, brought to a dry-powder state by the well-known atomizing process. To this mixture, I also add a suitable butter flavor and coloring matter, as well as baking-powder, each of which is in the form of a dry powder. Any other ingredients that may be found desirable may be added to the mixture, but in all cases the ingredients must be in the form of a dry powder, this form being desirable by reason of the fact that I am thereby enabled to obtain the exact proportions desired and also insure thorough and complete mixing of the ingredients, this thorough mixing of the ingredients being highly desirable not only because it adds to the keeping qualities of the mix, but also because it insures a definite and uniform texture to the baked product.

After the foregoing ingredients are thoroughly mixed, I subject the mass to a treatment which will drive out the remaining moisture. Of course, when the ingredients (except the flour) are thoroughly dried by the atomizing process, nevertheless there will only be a trace of moisture in the ingredients, and, besides, there will be a little moisture in the flour. It is highly necessary to eliminate even this trace of moisture from the mixture, since otherwise the mixture would not only spoil after a time but the baking-powder would lose its power to generate the carbon dioxid gas necessary to insure the proper rising of the dough. This final drying treatment is preferably obtained by subjecting the mixture to the action of a centrifugal drying machine and high temperature. I have found that this treatment removes the last trace of moisture and leaves the product virtually bone-dry, so that the baking-powder will be kept in prime condition for an indefinite period, provided the mixture when put on the market is packed in moisture-proof cartons.

As to the proportions of the mixture, I find that they may be greatly varied. The proportions, therefore, will be determined by the character of the product desired. I find that if the milk contains enough—say 12 per cent.—butter fat, no additional shortening is necessary. I have found also that in using the ordinary commercial baking-powders, the texture of the cake will vary; in one case the texture would be honey-combed, in another case the cake would be too heavy. I have found that baking-powder consisting of cream of tartar, sodium bicarbonate, ammonia and salt, produces excellent and uniform results.

The nature and scope of the invention having been thus indicated and its preferred embodiment having been specifically described, what is claimed as new is:

1. The method of preparing a food mixture in the form of a bone-dry powder for making cake dough, consisting of first reducing the ingredients to a dry-powder form, thoroughly mixing the ingredients in proper proportions, and finally expelling every trace of moisture from the mixture by centrifugal action under high temperature to produce a bone-dry mixture capable of keeping in prime condition indefinitely and then immediately packing this bone-dry mixture in moisture-proof receptacles.

2. The method herein described of producing a food compound for making cake-dough, consisting in mixing together flour, eggs, milk and baking-powder in the desired proportions and in a dry-powder form, then subjecting the mixture to a treatment that will drive off all moisture and thus leave a mixture of bone-dry powder form capable of being kept in prime condition for an indefinite length of time and then immediately packing this bone-dry mixture in moisture-proof receptacles.

In testimony whereof I hereunto affix my signature.

WILLIAM B. JOHNSON.